(12) United States Patent
Yun et al.

(10) Patent No.: US 11,241,946 B2
(45) Date of Patent: Feb. 8, 2022

(54) WEATHER STRIP FOR VEHICLE

(71) Applicants: Hyundai Motor Company, Seoul (KR); Kia Motors Corporation, Seoul (KR)

(72) Inventors: Young Uk Yun, Gyeonggi-do (KR); Kyoung Ho Cho, Gyeonggi-do (KR); Jae Hyuk Cheong, Gyeonggi-do (KR); Byeong Wook Park, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 42 days.

(21) Appl. No.: 16/656,905

(22) Filed: Oct. 18, 2019

(65) Prior Publication Data
US 2020/0231028 A1    Jul. 23, 2020

(30) Foreign Application Priority Data
Jan. 17, 2019    (KR) ........................ 10-2019-0006349

(51) Int. Cl.
*E06B 7/16*    (2006.01)
*B60J 10/84*    (2016.01)
*B60J 10/15*    (2016.01)

(52) U.S. Cl.
CPC .............. *B60J 10/84* (2016.02); *B60J 10/15* (2016.02)

(58) Field of Classification Search
CPC ... B60J 10/84; B60J 10/15; B60J 10/87; B60J 10/88; B60J 10/235; B60J 10/86; B60J 10/45

USPC ........ 49/490.1, 495.1, 377, 498.1; 296/146.9
See application file for complete search history.

(56) References Cited

U.S. PATENT DOCUMENTS

| | | | | |
|---|---|---|---|---|
| 2,933,781 | A * | 4/1960 | Cornell | E06B 7/2316 49/468 |
| 3,029,481 | A * | 4/1962 | Henniges | E06B 7/2314 49/482.1 |
| 3,038,217 | A * | 6/1962 | Harris | B60J 10/24 428/121 |
| 3,114,946 | A * | 12/1963 | Fluck | E06B 7/2316 49/470 |
| 4,571,889 | A * | 2/1986 | Labelle | E06B 9/17046 49/482.1 |
| 5,317,835 | A * | 6/1994 | Dupuy | B60J 10/235 49/377 |
| 5,524,955 | A * | 6/1996 | Brocke | B32B 17/10036 296/216.09 |
| 6,070,363 | A * | 6/2000 | Vance | B29C 65/56 277/921 |
| 6,220,969 | B1 * | 4/2001 | Lilley | F16D 3/845 464/173 |
| 7,325,859 | B1 * | 2/2008 | Brancaleone | B60J 5/0402 296/146.9 |

(Continued)

*Primary Examiner* — Jerry E Redman
(74) *Attorney, Agent, or Firm* — Mintz Levin Cohn Ferris Glovsky and Popeo, P.C.; Peter F. Corless

(57) ABSTRACT

A weather strip for a vehicle includes: an exterior weather strip mounted on an exterior edge of a door frame; and an interior weather strip pivotally connected to the exterior weather strip, where the exterior weather strip includes an exterior lip portion and a core, and the core includes a tube portion having a cavity in which a portion of the interior weather strip is received.

8 Claims, 5 Drawing Sheets

(56) References Cited

U.S. PATENT DOCUMENTS

| | | | | |
|---|---|---|---|---|
| 8,104,818 B2* | 1/2012 | Barre | ................ | B60R 13/06 |
| | | | | 296/70 |
| 8,240,091 B2* | 8/2012 | Cittadini | ................ | F25D 23/087 |
| | | | | 49/495.1 |
| 8,371,069 B2* | 2/2013 | O'Sullivan | ................ | B60J 10/30 |
| | | | | 49/492.1 |
| 8,991,102 B2* | 3/2015 | Minagawa | ................ | B60J 10/86 |
| | | | | 49/479.1 |
| 9,027,284 B2* | 5/2015 | Murree | ................ | B60J 10/265 |
| | | | | 49/495.1 |
| 9,718,338 B2* | 8/2017 | Nam | ................ | B60J 10/265 |
| 2003/0042756 A1* | 3/2003 | Ogawa | ................ | B60J 5/0406 |
| | | | | 296/146.9 |
| 2007/0137112 A1* | 6/2007 | Furuzawa | ................ | B60J 10/248 |
| | | | | 49/489.1 |
| 2011/0219701 A1* | 9/2011 | Fukuta | ................ | B60J 10/15 |
| | | | | 49/493.1 |
| 2012/0023831 A1* | 2/2012 | Matsumoto | ................ | B60J 10/30 |
| | | | | 49/489.1 |
| 2013/0292965 A1* | 11/2013 | Prater | ................ | B60J 10/265 |
| | | | | 296/146.2 |
| 2018/0298678 A1* | 10/2018 | Amagai | ................ | B60J 10/78 |

* cited by examiner

WEATHER STRIP FOR VEHICLE

CROSS-REFERENCE TO RELATED APPLICATION

This application claims under 35 U.S.C. § 119(a) the benefit of Korean Patent Application No. 10-2019-0006349, filed on Jan. 17, 2019 in the Korean Intellectual Property Office, the entire contents of which are incorporated by reference herein.

BACKGROUND

(a) Technical Field

The present disclosure relates to a weather strip for a vehicle, more particularly, to the weather strip that corresponds to a varying width of a varying frame molding to ensure sealing performance between a door frame and a vehicle body.

(b) Description of the Related Art

A vehicle has doors including a door panel and a door frame connected to the door panel. The door frame defines a window opening which is opened and closed by a door glass, and a door glass run and a weather strip are attached to the door frame. The door glass run may be configured to make a seal between the door frame and the door glass, and the weather strip may be configured to seal a clearance between the door frame and the vehicle body.

In order to improve an exterior of the door along a top edge of the door frame, a frame molding typically made of stainless steel may be attached to the door frame.

The frame molding may be attached to at least a portion of the door frame to meet aesthetic design requirements, for example, based on an individual design of a vehicle model. The frame molding may be configured such that a width thereof varies in a longitudinal direction of the door frame. Hereinafter, the frame molding having a varying width which is variable in the longitudinal direction of the door frame will be referred to as a "varying frame molding".

In order to correspond to the varying width of the varying frame molding the weather strip may be separated into an exterior weather strip (or also referred to as a parting weather strip) and an interior weather strip (or also referred to as a door weather strip), and the exterior weather strip and the interior weather strip may be individually mounted.

The exterior weather strip may be mounted to an exterior edge of the door frame through a molding mounting, and the interior weather strip may be positioned toward an interior of the vehicle relative to the exterior weather strip on the door frame. As a width of the varying frame molding is varied, a size and/or shape of the molding mounting may be varied, and the mounting position of the exterior weather strip may be adjusted by varying the size and/or shape of the molding mounting, so that the exterior weather strip may be mounted to correspond to the varying width of the varying frame molding.

The molding mounting may be coupled to the door frame by double-sided tape and a clip, and the variable frame molding may be coupled to the door frame by double-sided tape. The interior weather strip may be coupled to the door frame by a fastening structure, and the exterior weather strip may be coupled to the door frame by the molding mounting and the frame molding.

The door frame may have a channel-shaped retainer, and the interior weather strip may be mounted on the channel-shaped retainer. It may be difficult to stably secure the mounting quality of the interior weather strip due to variability of quality of the retainer.

In addition, an edge of the interior weather strip and an edge of the exterior weather strip may be overlapped or separated from each other, which may degrade the exterior design or exterior quality.

Such a conventional weather strip has the interior weather strip and the exterior weather strip individually manufactured and separately mounted on the door frame to correspond to the varying width of the varying frame molding, and accordingly assembling the strips may be very difficult, and the assembly quality, the exterior quality, and the like may be reduced.

The above information described in this background section is provided to assist in understanding the background of the inventive concept, and may include any technical concept which is not considered as the prior art that is already known to those skilled in the art.

SUMMARY

An aspect of the present disclosure provides a weather strip for a vehicle which corresponds to a varying width of a varying frame molding to ensure sealing performance between a door frame and a vehicle body, and facilitate the assembly thereof as well as improving the exterior quality and mounting quality thereof.

According to an aspect of the present disclosure, a weather strip for a vehicle may include: an exterior weather strip mounted on an exterior edge of a door frame; and an interior weather strip pivotally connected to the exterior weather strip.

The exterior weather strip may include an exterior lip portion and a core, and the core may include a tube portion having a cavity in which a portion of the interior weather strip is received.

The core may be made of a hard material.

The interior weather strip may include an interior sealing portion and a cylindrical portion connected to the interior sealing portion, and the cylindrical portion may be rotatably received in the cavity of the core.

The cylindrical portion is connected to the core through a plurality of bridges, and each of the bridges may be elastically deformed.

The exterior weather strip may include a base portion mounted on the exterior edge of the door frame, the exterior lip portion may extend from the base portion toward an exterior edge of a vehicle body, and the core may be integrally combined with the base portion.

The base portion and the exterior lip portion may be made of a soft material.

The interior weather strip may include an extension portion extending from the interior sealing portion toward the exterior weather strip, and an interior lip portion formed on a bottom end of the interior sealing portion.

The interior sealing portion may include an upper wall extending in an arc shape, a lower wall extending in an inclined direction, and a cavity defined by the upper wall and the lower wall.

The interior weather strip may be made of a soft material.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
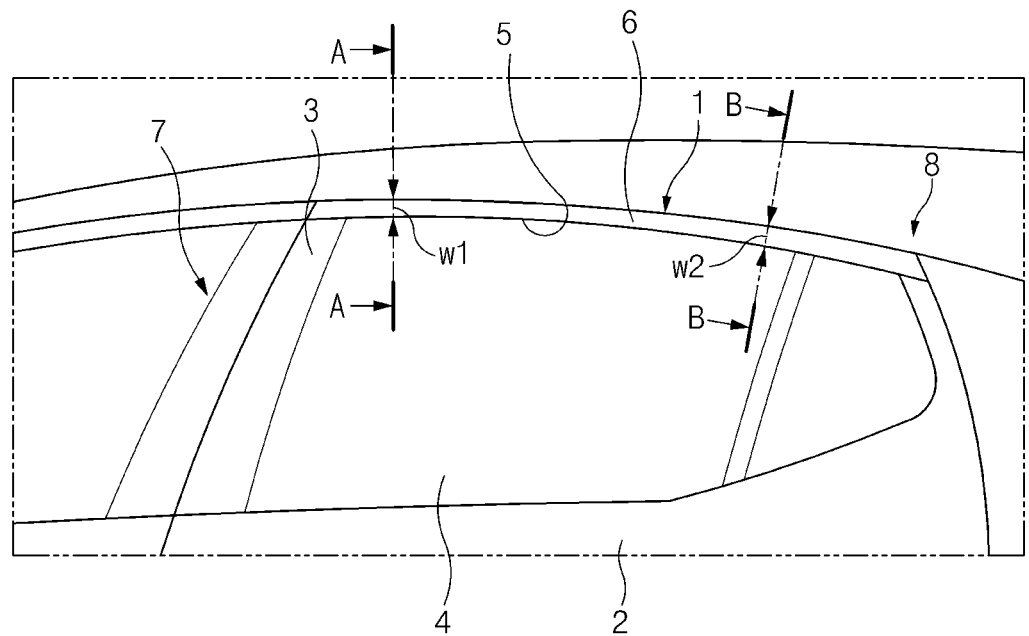
FIG. 1 illustrates a vehicle door according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising" when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, exemplary embodiments of the present disclosure will be described in detail with reference to the accompanying drawings. In the drawings, the same reference numerals will be used throughout to designate the same or equivalent elements. In addition, a detailed description of well-known techniques associated with the present disclosure will be ruled out in order not to unnecessarily obscure the gist of the present disclosure.

Terms such as first, second, A, B, (a), and (b) may be used to describe the elements in exemplary embodiments of the present disclosure. These terms are only used to distinguish one element from another element, and the intrinsic features, sequence or order, and the like of the corresponding elements are not limited by the terms. Unless otherwise defined, all terms used herein, including technical or scientific terms, have the same meanings as those generally understood by those with ordinary knowledge in the field of art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

In this description, the term "interior" refers to a direction toward an interior space of a vehicle, and the term "exterior" refers to a direction toward an exterior space of the vehicle. In addition, the term "inner" refers to a direction toward the center of a window opening of a door frame, and the term "outer" refers to a direction away from the center of the window opening of the door frame.

Referring to FIG. 1, a vehicle door 1 may include a door panel 2, and a door frame 3 connected to the door panel 2.

Figure 2:
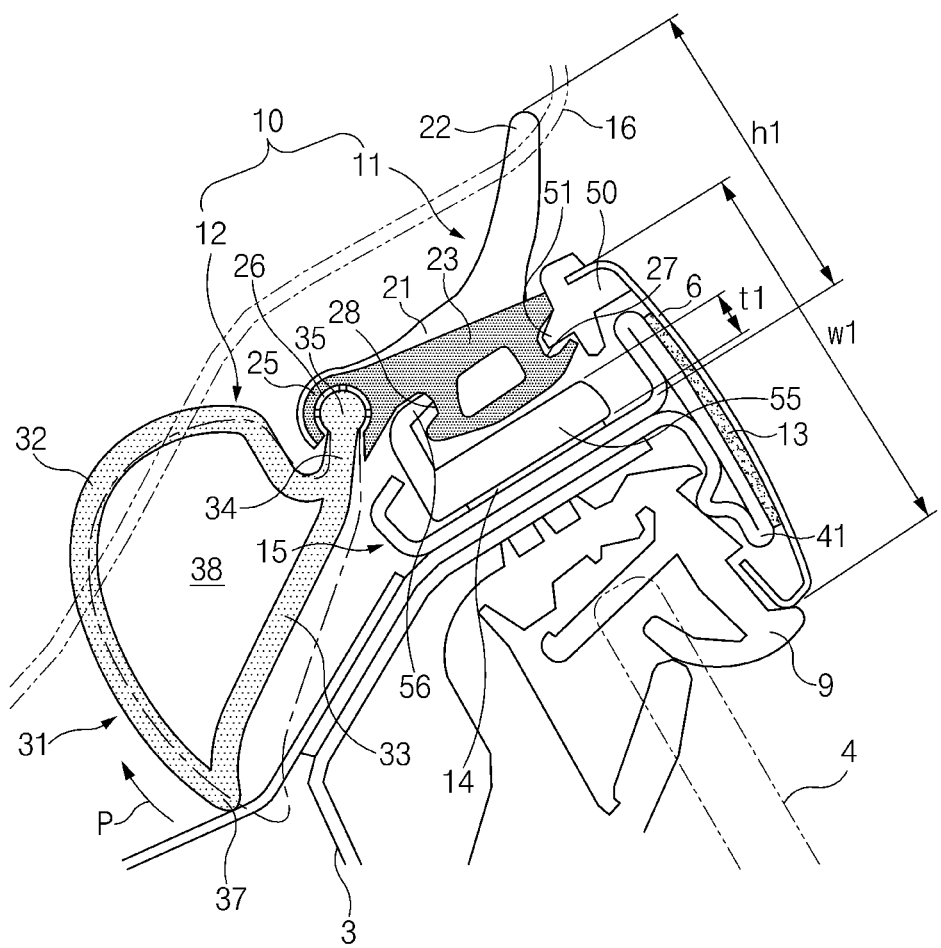
FIG. 2 illustrates a cross-sectional view taken along line A-A of FIG. 1.
Figure 3:
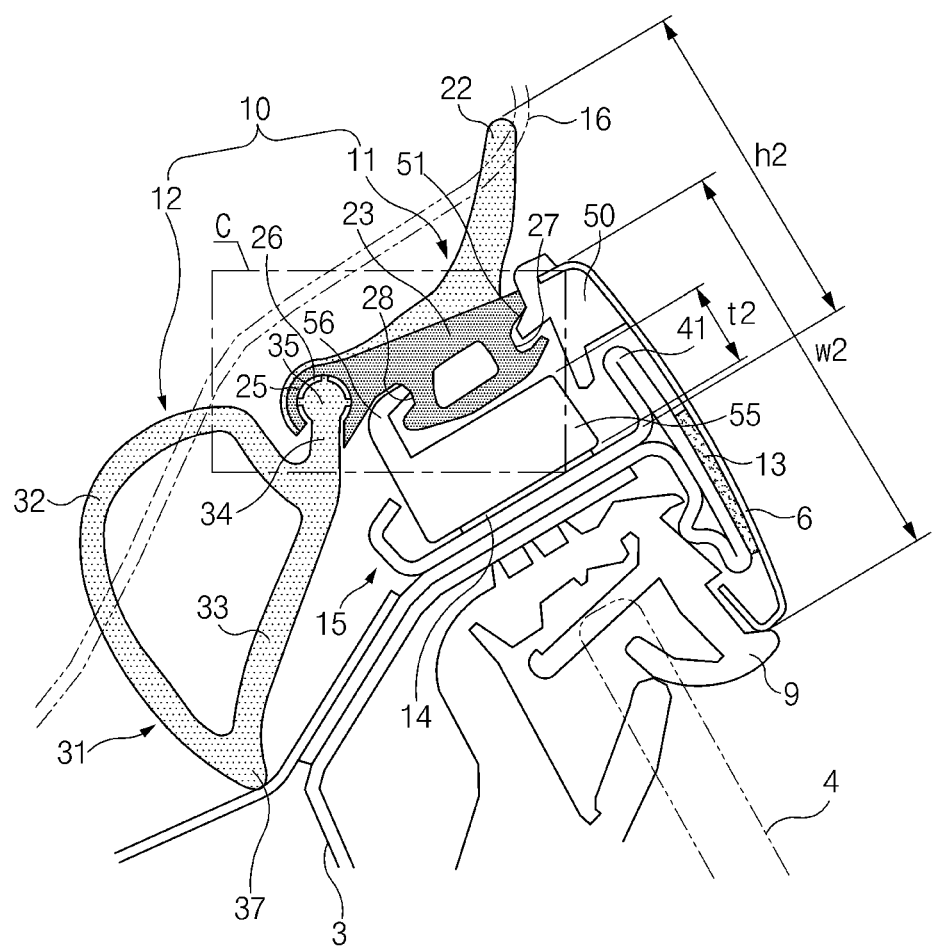
FIG. 3 illustrates a cross-sectional view taken along line B-B of FIG. 1.
Figure 4:
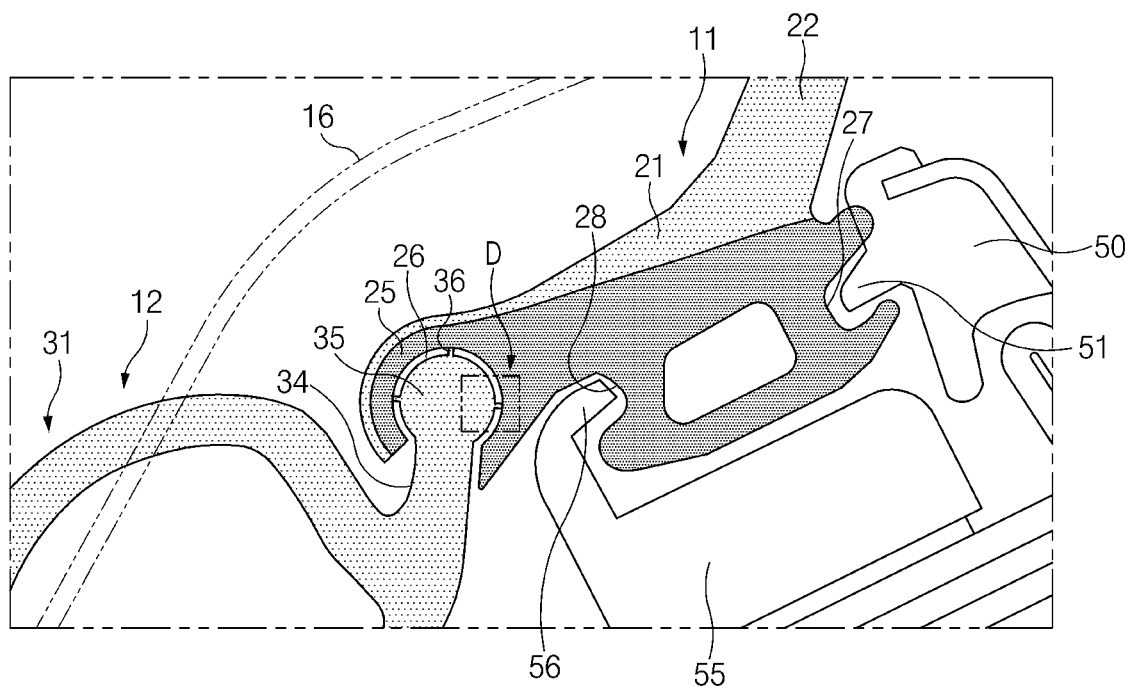
FIG. 4 illustrates an enlarged view of portion C of FIG. 3.

The door frame 3 defines a window opening 5, and a door glass 4 may be fixed to or movably mounted to the window opening 5. A varying frame molding 6 may be attached to a top edge of the door frame 3. A width of the varying frame molding 6 may be varied in a longitudinal direction of the door frame 3. That is, the varying frame molding 6 may have a varying width which is variable in the longitudinal direction of the door frame 3. For example, the vehicle door 1 illustrated in FIG. 1 may be a rear door, and the width of the varying frame molding 6 may gradually increase from a B-pillar 7 to a C-pillar 8 (W1<W2). As illustrated in FIGS. 2 and 3, a second width W2 (see FIG. 3) of the varying frame molding 6 adjacent to the C-pillar 8 may be greater than a first width W1 (see FIG. 2) of the varying frame molding 6 adjacent to the B-pillar 7 (W1<W2). Due to the varying width of the varying frame molding 6, the exterior design of the vehicle may be improved.

Referring to FIGS. 2 and 3, a door glass run 9 may be attached to the inner periphery of the door frame 3, and the door glass run 9 may make a seal between the door frame 3 and the door glass 4.

The door frame 3 may have a mounting flange 41 formed on an exterior edge thereof, and the varying frame molding 6 may be attached to an exterior surface of the mounting flange 41 by an adhesive tape 13 or the like. The door frame 3 may have a channel-shaped retainer 15, and the retainer 15 may be positioned inwardly of the mounting flange 41.

According to an exemplary embodiment of the present disclosure, the varying frame molding 6 may have a holder 50 coupled to a top end thereof, and the holder 50 may be made of a resin material or the like. For example, the holder 50 may be integrally formed with the top end of the varying frame molding 6 by insert molding. The holder 50 may have a first holding hook 51, and the first holding hook 51 may be fitted into a first groove 27 of an exterior weather strip 11 of a weather strip 10 to be described below.

A molding mounting 55 may be attached to the retainer 15 of the door frame 3 by an adhesive tape 14 or the like, and the molding mounting 55 may have a second holding hook 56 opposite to the first holding hook 51 of the holder 50. The second holding hook 56 may be fitted into a second groove 28 of the exterior weather strip 11 of the weather strip 10 to be described below.

A thickness of the molding mounting 55 may be varied to correspond to variations in the width of the varying frame molding 6. For example, the molding mounting 55 may have a first thickness t1 corresponding to the first width W1 of the varying frame molding 6 as illustrated in FIG. 2, and the molding mounting 55 may have a second thickness t2 corresponding to the second width W2 of the varying frame molding 6 as illustrated in FIG. 3. The second thickness t2 (see FIG. 3) of the molding mounting 55 adjacent to the C-pillar 8 may be greater than the first thickness t1 (see FIG. 2) of the molding mounting 55 adjacent to the B-pillar 7 (t1<t2). That is, the molding mounting 55 may have a varying thickness which is variable in the longitudinal direction of the door frame 3.

Referring to FIGS. 2 and 3, the weather strip 10 according to an exemplary embodiment of the present disclosure may include the exterior weather strip 11, and an interior weather strip 12 pivotally or bendably connected to the exterior weather strip 11.

The exterior weather strip 11 may be disposed between an exterior edge of the door frame 3 and an exterior edge of a vehicle body 16. The exterior weather strip 11 may be attached to the exterior edge of the door frame 3.

The exterior weather strip 11 may include a base portion 21 mounted to the exterior edge of the door frame 3, and an exterior lip portion 22 extending from the base portion 21 toward the exterior edge of the vehicle body 16. The base portion 21 and the exterior lip portion 22 may be made of a soft material such as soft rubber. As the exterior lip portion 22 is easily deformed, the sealing performance of the exterior weather strip 11 may be ensured. As the exterior lip portion 22 contacts the exterior edge of the vehicle body 16 in a state in which the vehicle door 1 is closed, the exterior lip portion 22 may seal a clearance between the exterior edge of the door frame 3 and the exterior edge of the vehicle body 16.

Figure 5:
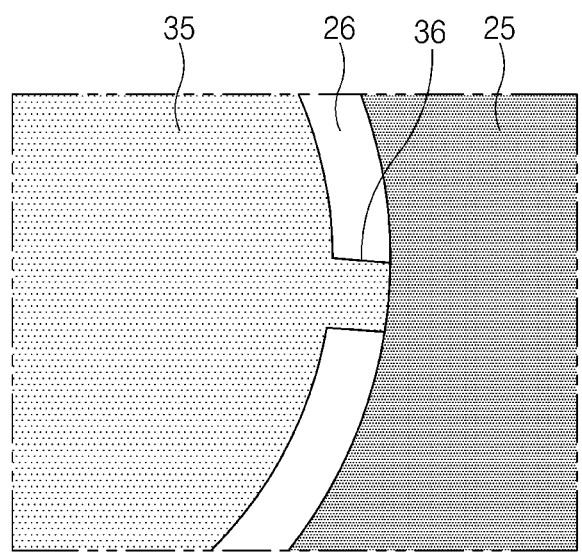
FIG. 5 illustrates an enlarged view of portion D of FIG. 4.

A core 23 may be provided to the base portion 21, and the core 23 may be made of a hard material such as hard rubber, so that the stiffness of the exterior weather strip 11 may be ensured. The core 23 may include a tube portion 25, and as illustrated in FIG. 5, the tube portion 25 may have a cavity 26 in which a cylindrical portion 35 of the interior weather strip 12 to be described below is received. The base portion 21 may cover the upper surface of the core 23 and the upper surface of the tube portion 25.

The core 23 may have the pair of grooves 27 and 28, and the pair of grooves 27 and 28 may include the first groove 27 positioned outwardly of the door frame 3, and the second groove 28 positioned inwardly of the door frame 3. The first holding hook 51 of the holder 50 of the varying frame molding 6 may be fitted into the first groove 27 of the core 23, and the second holding hook 56 of the molding mounting 55 may be fitted into the second groove 28 of the core 23 so that the exterior weather strip 11 may be mounted in the retainer 15 of the door frame 3. The core 23 may be integrally combined with the base portion 21 by insert molding, so that the core 23 and the base portion 21 may form a unitary one-piece.

The interior weather strip 12 may be positioned toward the interior of the vehicle relative to the exterior weather strip 11. The interior weather strip 12 may include an interior sealing portion 31, and the interior sealing portion 31 may have a tubal shape with a cavity 38 in the inside thereof. The interior sealing portion 31 may have an upper wall 32 extending in an arc shape, and a lower wall 33 extending in an inclined direction, and the cavity 38 may be defined by the upper wall 32 and the lower wall 33. The interior weather strip 12 may have an extension portion 34 extending from the interior sealing portion 31 toward the exterior weather strip 11, and an interior lip portion 37 formed on a bottom end of the interior sealing portion 31. The extension portion 34 may extend from a connected portion of the upper wall 32 and the lower wall 33 toward the exterior weather strip 11, and the interior lip portion 37 may be formed to have a peak shape at the bottom end of the lower wall 33.

As the upper wall 32 of the interior sealing portion 31 contacts the vehicle body 16, and the interior lip portion 37 of the interior sealing portion 31 contacts the door frame 3 in a state in which the vehicle door 1 is closed, the interior sealing portion 31 may seal the clearance between the door frame 3 and the vehicle body 16.

The interior weather strip 12 may be made of a soft material such as soft rubber. The interior sealing portion 31 and the interior lip portion 37 may be easily deformed, so that the sealing performance of the interior weather strip 12 may be ensured.

The interior weather strip 12 may include the cylindrical portion 35 which is rotatably received in the cavity 26 of the tube portion 25. Referring to FIG. 2, as the cylindrical portion 35 rotates in the cavity 26 of the tube portion 25 to correspond to the varying width of the varying frame molding 6, the interior weather strip 12 may pivot or be bent in a predetermined direction (see a direction indicated by arrow P in FIG. 2). As the interior weather strip 12 may pivot or be bent in relation to the exterior weather strip 11 to correspond to the varying width of the varying frame molding 6, the interior lip portion 37 of the interior weather strip 12 may tightly contact the door frame 3.

According to an exemplary embodiment, the cylindrical portion 35 may be integrally formed with an end of the extension portion 34, so that the cylindrical portion 35 may be integrally connected to the interior sealing portion 31 of the interior weather strip 12.

The cylindrical portion 35 may have a circular cross-section, the cylindrical portion 35 may be integrally connected to the core 23 of the exterior weather strip 11 through a plurality of bridges 36. The plurality of bridges 36 may physically connect between an exterior surface of the cylindrical portion 35 and an interior surface of the tube portion 25. The plurality of bridges 36 may have a thickness enough to be elastically deformed. The plurality of bridges 36 may be spaced apart from each other on the exterior surface of the cylindrical portion 35 in a cylindrical direction, each bridge 36 may extend radially from the cylindrical portion 35. When the cylindrical portion 35 of the interior weather strip 12 rotates around a center axis of the tube portion 25 of the exterior weather strip 11, each bridge 36 may be elastically deformed, and the cylindrical portion 35 of the interior weather strip 12 may return to its original position with respect to the tube portion 25 of the exterior weather strip 11 by the plurality of bridges 36. The cylindrical portion 35 of the interior weather strip 12 may not be separated from the tube portion 25 of the exterior weather strip 11 by the plurality of bridges 36, and the interior weather strip 12 may be integrally connected to the exterior weather strip 11. That is, the interior weather strip 12 and the exterior weather strip 11 may be configured to form a unitary one-piece.

A mounting position of the exterior weather strip 11 may be varied to correspond to the varying width W1 or W2 of the varying frame molding 6 and the thickness t1 or t2 of the molding mounting 55. For example, as illustrated in FIGS.

2 and 3, as the second thickness t2 of the molding mounting 55 the second width W2 of the varying frame molding 6 which are adjacent to the C-pillar 8 are greater than the first thickness t1 of the molding mounting 55 and the first width W1 of the varying frame molding 6 which are adjacent to the B-pillar 7, a mounting height h2 (see FIG. 3) of the exterior weather strip 11 adjacent to the C-pillar 8 may be higher than a mounting height h1 (see FIG. 2) of the exterior weather strip 11 adjacent to the B-pillar 7.

According to exemplary embodiments of the present disclosure, as the mounting height of the exterior weather strip 11 is varied to correspond to the varying width of the varying frame molding 6 and the varying thickness of the molding mounting 55, the cylindrical portion 35 of the interior weather strip 12 may rotate in the tube portion 25 of the exterior weather strip 11, and accordingly the interior weather strip 12 may pivot or be bent with respect to the exterior weather strip 11, so that the interior weather strip 12 and the exterior weather strip 11 may be easily assembled into or mounted to the door frame 3, and the clearance between the door frame 3 and the vehicle body 16 may be tightly sealed.

In addition, according to exemplary embodiments of the present disclosure, the exterior weather strip 11 and the interior weather strip 12 may form a unitary one-piece by the tube portion 25 and the cylindrical portion 35 so that the exterior quality and mounting quality of the weather strip 10 may be improved, and the manufacturing cost and assembly man-hour thereof may be reduced.

As set forth above, according to exemplary embodiments of the present disclosure, the weather strip may correspond to the varying width of the varying frame molding to ensure the sealing performance between the door frame and the vehicle body, and facilitate the assembly thereof as well as improving the exterior quality and mounting quality thereof.

According to exemplary embodiments of the present disclosure, as the mounting height of the exterior weather strip is varied to correspond to the varying width of the varying frame molding and the varying thickness of the molding mounting, the cylindrical portion of the interior weather strip may rotate in the tube portion of the exterior weather strip, and accordingly the interior weather strip may pivot or be bent with respect to the exterior weather strip, so that the interior weather strip and the exterior weather strip may be easily assembled into or mounted to the door frame, and the clearance between the door frame and the vehicle body may be tightly sealed.

In addition, according to exemplary embodiments of the present disclosure, the exterior weather strip and the interior weather strip may form a unitary one-piece by the tube portion and the cylindrical portion so that the exterior quality and mounting quality of the weather strip may be improved, and the manufacturing cost and assembly man-hour thereof may be reduced.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A weather strip for a vehicle, the weather strip comprising:
   an exterior weather strip mounted on an exterior edge of a door frame, the exterior weather strip including a core having a cavity; and
   an interior weather strip pivotally connected to the exterior weather strip, the interior weather strip including a cylindrical portion received in the cavity of the core,
   wherein the cylindrical portion is connected to the core through a bridge,
   wherein the bridge is elastically deformed, and
   wherein the interior weather strip is made of a material that is softer than a material of the exterior weather strip.

2. The weather strip according to claim 1, wherein the exterior weather strip includes an exterior lip portion.

3. The weather strip according to claim 2, wherein the core is made of a material that is harder than a material of the exterior lip portion.

4. The weather strip according to claim 2, wherein the interior weather strip includes an interior sealing portion.

5. The weather strip according to claim 4, wherein the interior weather strip includes an extension portion extending from the interior sealing portion toward the exterior weather strip, and an interior lip portion formed on a bottom end of the interior sealing portion.

6. The weather strip according to claim 4, wherein the interior sealing portion includes an upper wall extending in an arc shape, a lower wall extending in an inclined direction, and a cavity defined by the upper wall and the lower wall.

7. The weather strip according to claim 2, wherein the exterior weather strip includes a base portion mounted on the exterior edge of the door frame,
   the exterior lip portion extends from the base portion toward an exterior edge of a vehicle body, and
   the core is integrally combined with the base portion.

8. The weather strip according to claim 7, wherein the base portion and the exterior lip portion are made of a material that is softer than a material of the core.

* * * * *